United States Patent
Llamas Virgen et al.

(10) Patent No.: US 12,395,558 B2
(45) Date of Patent: Aug. 19, 2025

(54) VIRTUALIZING INTERNET-OF-THINGS DEVICES IN VIRTUAL ENVIRONMENTS

(71) Applicant: International Business Machines Corporation, Armonk, NY (US)

(72) Inventors: Paul Llamas Virgen, Guadalajara (MX); Romelia H. Flores, Keller, TX (US); Dario Andres Silva Moran, La Plata (AR); Su Liu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/232,516

(22) Filed: Aug. 10, 2023

(65) Prior Publication Data

US 2025/0055909 A1  Feb. 13, 2025

(51) Int. Cl.
*H04L 67/12* (2022.01)
*G16Y 20/10* (2020.01)
*G16Y 40/20* (2020.01)

(52) U.S. Cl.
CPC .............. *H04L 67/12* (2013.01); *G16Y 20/10* (2020.01); *G16Y 40/20* (2020.01)

(58) Field of Classification Search
CPC .......... H04L 67/12; G06F 3/011; G06F 3/017; G16Y 20/10; G16Y 40/20
USPC ......................................................... 709/217
See application file for complete search history.

(56) References Cited

U.S. PATENT DOCUMENTS

| | | | |
|---|---|---|---|
| 9,606,817 B1 | 3/2017 | Efstathopoulos | |
| 10,680,845 B2 | 6/2020 | Ocher | |
| 11,257,596 B2 | 2/2022 | Cho | |
| 11,262,903 B2 | 3/2022 | Lee | |
| 11,290,537 B1 | 3/2022 | Argenti | |
| 11,297,165 B2 | 4/2022 | Tomizuka | |
| 11,393,153 B2 | 7/2022 | Yan | |
| 2021/0328880 A1 | 10/2021 | Kim | |
| 2021/0377214 A1 | 12/2021 | Palnati | |
| 2022/0100263 A1* | 3/2022 | Nagar | G05D 1/0016 |
| 2022/0148741 A1 | 5/2022 | Griffor | |
| 2022/0165438 A1* | 5/2022 | Marzorati | G05B 13/04 |

(Continued)

FOREIGN PATENT DOCUMENTS

WO    WO-2020179406 A1 *  9/2020  ......... G06F 3/04817

OTHER PUBLICATIONS

"Virtual Reality Market Size, Share & Trends Analysis Report By Technology (Semi & Fully Immersive, Non-Immersive), By Device (HMD, GTD), By Component (Hardware, Software), By Application, By Region, And Segment Forecasts, 2023-2030", Grand View Research, Printed May 9, 2023, 13 pages, <https://www.grandviewresearch.com/industry-analysis/virtual-reality-vr-market>.

(Continued)

*Primary Examiner* — Glenford J Madamba
(74) *Attorney, Agent, or Firm* — Andre L. Adkins (57) ABSTRACT

Techniques are described with respect to a system, method, and computer program product for representing Internet-Of-Things (IOT) devices in a virtual environment. An associated method includes detecting a plurality of IOT devices associated with a physical space; extracting a plurality of IOT capabilities associated with the plurality of IOT devices; rendering a virtual IOT device based on the plurality of IOT capabilities; and visualizing the virtual IOT device within the virtual environment associated with the physical space.

20 Claims, 6 Drawing Sheets

(56) References Cited

U.S. PATENT DOCUMENTS

| | | |
|---|---|---|
| 2022/0329453 A1 | 10/2022 | Sanders |
| 2022/0362674 A1 | 11/2022 | Walker |
| 2023/0062763 A1 | 3/2023 | Jiang |
| 2023/0076353 A1 | 3/2023 | Canberk |

OTHER PUBLICATIONS

Abe et al., "Digital Construction: Demonstration of Interactive Assembly Using Smart Discrete",Protocols, Flows and Glitches, Proceedings of the 22nd International Conference of the Association for Computer-Aided Architectural Design Research in Asia (CAADRIA) 2017, 75-85. © 2017, The Association for Computer-Aided Architectural Design Research in Asia (CAADRIA), Hong Kong., <http://papers.cumincad.org/data/works/att/caadria2017_131.pdf>.

Jaafar et al., "AR Simulasi : An Augmented Reality Real-Time Cloud-Based Simulation For Off-Site Monitoring In Industrial Manufacturing Application", International Transaction Journal of Engineering, Management, & Applied Sciences & Technologies, vol. 12 Issue 9, Mar. 1, 2021, 9 pages.

Nor'a et al., "Integrating Virtual Reality And Augmented Reality In A Collaborative User Interface",International Journal of Innovative Computing, vol. 9:2, 2019, pp. 59-64.

Phupattanasilp et al., "Augmented Reality In The Integrative Internet Of Things (AR-IoT): Application For precision Farming", Sustainability 2019, 11, 2658. https://doi.org/10.3390/su11092658, 17 pages.

Simiscuka et al., "Synchronization Between Real And Virtual-World Devices In A VR-IoT Environment", Proceedings of the 2018 IEEE International Symposium on Broadband Multimedia Systems and Broadcasting (BMSB), Jun. 6-8, 2018, Valencia, Spain, 6 pages.

Toumpalidis et al., "VR Binoculars: An Immersive Visualization Framework For IoT Data Streams", Proceedings of the Living in the Internet of Things: Cybersecurity of the IoT—2018, Mar. 28-29, 2018, London, UK, 7 pages.

\* cited by examiner

VIRTUALIZING INTERNET-OF-THINGS DEVICES IN VIRTUAL ENVIRONMENTS

FIELD

The present invention relates to visualizing Internet of Things (IOT) device capabilities. Specifically, the present invention relates to a method and system for visualizing IOT device capabilities within virtual, augmented, mixed, and/or extended reality-based environments.

BACKGROUND

Virtual, augmented, mixed, and extended reality encompasses the visualization of virtual environments in which physical and digital objects co-exist allowing users represented as avatars to virtual interact with the virtual environments along with their components. However, these virtual environments are shared across multiple users operating over networks resulting in a lack of affinity among users with personal and/or social connections.

Internet-of-Things ("IOT") refers to the concept of extending internet connectivity beyond conventional computing platforms into any range of traditionally non-internet-enabled physical devices and everyday objects. Embedded with electronics, internet connectivity, and other forms of hardware (such as sensors), these devices and objects can communicate and interact with customers over a network connection, and the devices and objects can be remotely monitored and controlled. IOT devices inherently include various capabilities and functionalities; however, in instances in which a specific capability or functionality is desired by a user it is difficult to determine which IOT device is necessary to provide said capability or functionality especially if the applicable IOT device is not present in the physical space.

Augmented reality (AR) is an interactive experience combining virtual elements, with a real world environment where the objects that reside in the real world are enhanced by computer-generated perceptual information, sometimes across multiple sensory modalities, including visual, auditory, haptic, somatosensory, and olfactory. AR can be defined as a system that fulfills a combination of real and virtual worlds, real-time interaction, and accurate 3D registration of virtual and real objects. With the assistance of advanced AR technologies along with artificial intelligence technologies, information about the capabilities and/or functionalities of IOT devices is able to be overlaid on the real world. In addition, predictions of virtualized IOT devices comprising innovative capabilities associated with predictions derived from capabilities of present IOT devices.

SUMMARY

Additional aspects and/or advantages will be set forth in part in the description which follows and, in part, will be apparent from the description, or may be learned by practice of the invention.

Aspects of an embodiment of the present invention disclose a method, system, and computer program product for representing Internet-Of-Things (IOT) devices in a virtual environment. In some embodiments, the computer-implemented method for representing Internet-Of-Things (IOT) devices in a virtual environment comprises detecting a plurality of IOT devices associated with a physical space; extracting a plurality of IOT capabilities associated with the plurality of IOT devices; rendering a virtual IOT device based on the plurality of IOT capabilities; and visualizing the virtual IOT device within the virtual environment associated with the physical space.

In some aspects of an embodiment of the present invention, at least one innovative capability applicable to the physical space is ascertained based on an analysis of the physical in which the at least one innovative capability is aggregated with the plurality of IOT capabilities, and one or more machine learning models generate at least one output representing the innovative capability the capability of the virtual IOT device.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e., is a computer-implementable method. The various steps of the method therefore reflect various parts of a computer program, e.g., various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

As described herein, virtual reality ("VR") refers to a computing environment configured to support computer-generated objects and computer mediated reality incorporating visual, auditory, and other forms of sensory feedback. It should be noted that a VR environment may be provided by any applicable computing device(s) configured to support a VR, augmented reality, and/or mixed reality user interacting with their surroundings, said interactions including but not limited to user movement/gazing, manipulation of virtual and non-virtual objects, or any other applicable interactions between users and computing devices known to those of ordinary skill in the art.

As described herein, augmented reality is technology that enables enhancement of user perception of a real-world environment through superimposition of a digital overlay in a display interface providing a view of such environment. Augmented reality enables display of digital elements to highlight or otherwise annotate specific features of the physical world based upon data collection/analysis and machine learning outputs when applicable. For instance, augmented reality can provide respective visualizations of various layers of information pertaining to IOT devices and their capabilities.

As described herein, a "virtual environment" is a digital space generated by the applicable virtual, augmented, mixed, and/or extended reality-based platform(s) based on physical spaces associated with users, in which the virtual environment is configured to support visualization of the virtual IOT device along with its innovative capabilities. In some embodiments, the visualization of the virtual IOT device and IOT capabilities are based on the ascertained context of the virtual environment derived from analyses of the physical space.

It is further understood that although this disclosure includes a detailed description on cloud-computing, implementation of the teachings recited herein are not limited to a cloud-computing environment. Rather, embodiments of the present invention are capable of being implemented in conjunction with any other type of computing environment now known or later developed.

The following described exemplary embodiments provide a method, computer system, and computer program product for representing Internet-Of-Things (IOT) devices in a virtual environment. Internet of things (IOT) devices are objects embedded with sensors, software, and other technology that can exchange data with other devices and systems over the Internet. IOT devices have applications in many fields including, but not limited to household appliances, medical, transportation, agriculture, military, etc. allowing users to communicate with devices and objects in order to support remote controlling, monitoring, and the like. Nonetheless, certain IOT devices within a physical space may not include the full spectrum of capabilities/functionalities. For example within a "smart home" environment, the current IOT devices within the applicable physical space may not individually support thermal monitoring for power distribution. However, the combination of the capabilities of the respective IOT devices along with artificial intelligence techniques applied to data collected/analyzed of the IOT devices results in the capability of thermal monitoring for power distribution. Thus, the present embodiments have the capacity to not only improve IOT device capabilities, but also render innovative capabilities of IOT devices by generating virtual IOT devices within virtual environments that support simulations of the innovative capabilities within a virtual environment associated with the physical space.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
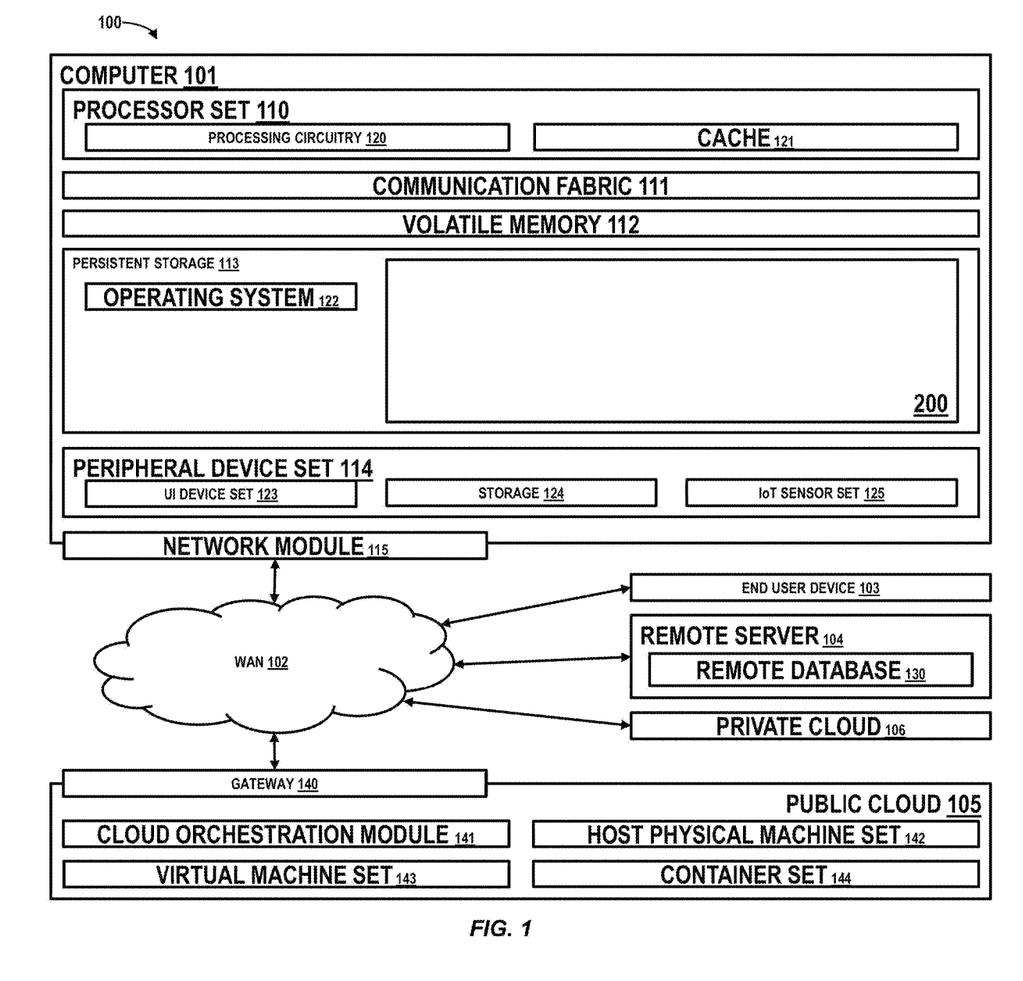
FIG. 1 illustrates a networked computer environment, according to an exemplary embodiment.

The following described exemplary embodiments provide a system, method, and computer program product for representing Internet-Of-Things (IOT) devices in a virtual environment. Referring now to FIG. 1, a computing environment 100 contains an example of an environment for the execution of at least some of the computer code involved in performing the inventive methods, such as system 200. In addition to system 200, computing environment 100 contains an example of an environment for the execution of at least some of the computer code involved in performing the inventive methods. Computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and system 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, computer-mediated reality device (e.g., AR/VR headsets, AR/VR goggles, AR/VR glasses, etc.), mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) payment device), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD payment device. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter payment device or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
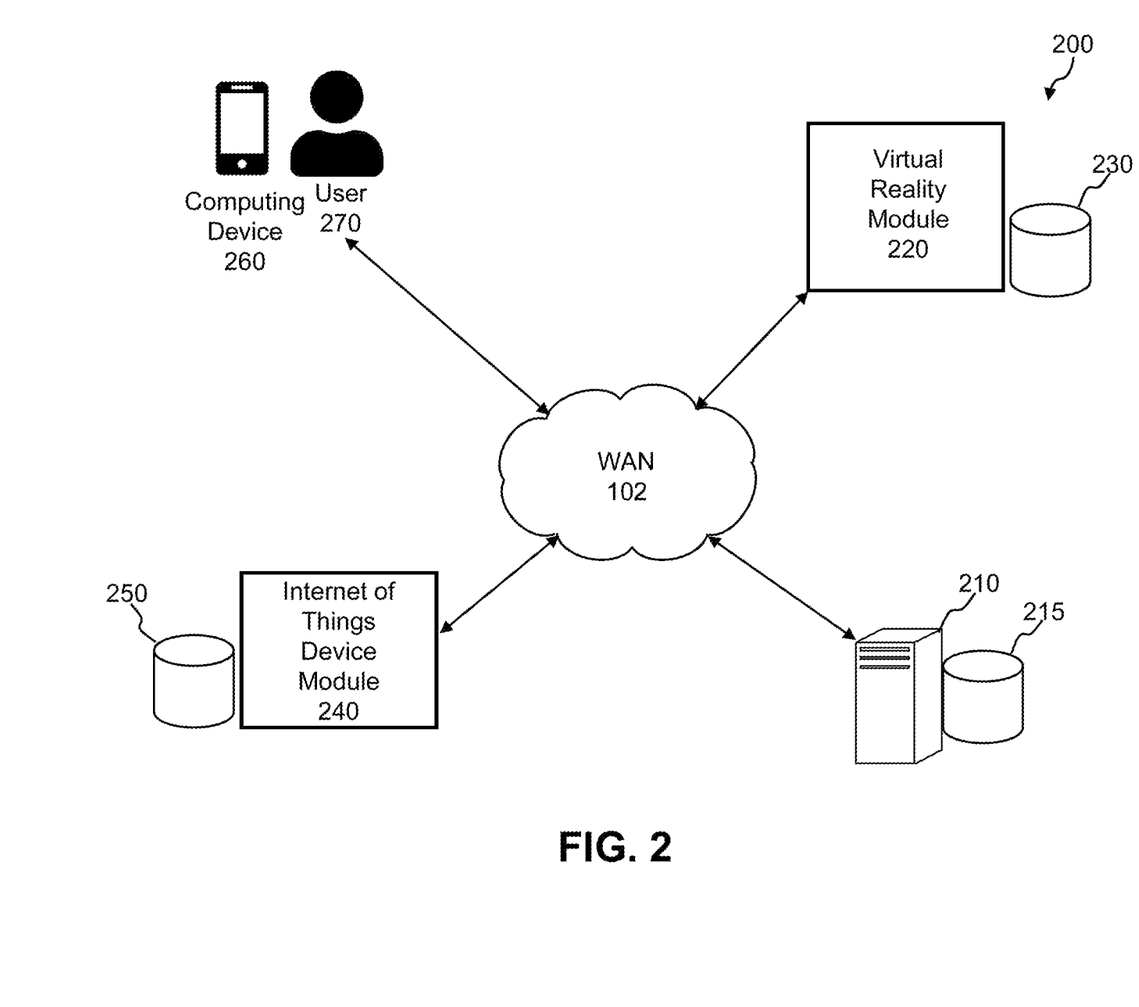
FIG. 2 illustrates a block diagram of an IOT device virtualization system environment, according to an exemplary embodiment.

Referring now to FIG. 2, a functional block diagram of a networked computer environment illustrating a computing environment for IOT device virtualization system 200 (hereinafter "system") comprising a server 210 communicatively coupled to a database 215, a virtual reality module 220, a virtual reality module database 230, an IOT device module 240, an IOT device module database 250, and a computing device 260 associated with a user 270, each of which are communicatively coupled over WAN 102 (hereinafter "network") and data from the components of system 200 transmitted across the network is stored in database 215. In some embodiments, server 210 is configured to operate a centralized platform serving as a cloud-based IOT device analysis and virtual IOT device visualizing mechanism. Server 210 is configured to provide a mechanism for user 270 to provide user inputs and establish preferences, view IOT device analytics and simulations of capabilities of virtual IOT devices which are the result of capabilities extracted from the IOT devices and/or combinations thereof, and the like via accessing one or more user interfaces and application programming interfaces (APIs) provided to computing device 260.

Virtual reality module 220 is configured to not only generate virtual environments derived from analyses of the physical space surrounding user 270, but also supports analyses of the virtual environments. In addition, virtual reality module 220 is configured to ascertain the context of the virtual environment from the analyses in order to determine applicable capabilities of IOT devices that apply to virtual environment based on the context. Virtual reality module 220 is designed to ascertain contextual information, computational/bandwidth requirements, virtual objects/elements, type of virtual environment, geographic data, spatial/temporal data, or any other applicable ascertainable information associated with analyzing a virtual environment or digital space known to those of ordinary skill in the art. The data that is processed and analyzed by virtual reality module 220 is configured to be stored in virtual reality module database 230, in which virtual reality module database 230 is designed to function as a repository continuously updated with not only data relating to IOT devices visualized within the virtual environment, but also data ascertained from the analyses performed by virtual reality module 220. Virtual reality module database 230 may also store previously generated virtual IOT devices, innovative capabilities thereof, and simulations of the aforementioned generated by IOT device module 240 configured to be depicted in the virtual environment generated by virtual reality module 220. In some embodiments, receives simulations of innovative capabilities assigned to virtual IOT devices in addition to consequences of the innovative capabilities visualized by virtual reality module 220 within the virtual environment based on contextual situations (such as test cases) that may result in reactions, consequences, accidents, etc. directly correlated to the innovative capabilities.

Internet-Of-Things (IOT) device module 240 is tasked with identifying IOT devices within the physical space associated with user 270, and analyzing the identified IOT devices in order to ascertain their respective capabilities. In addition, IOT device module 240 is tasked with mapping capabilities of IOT devices and utilizing one or more machine learning algorithms to ascertain innovative capabilities that are not available among the currently present identified IOT devices. Thus, the innovative capabilities are configured to be assigned to the virtual IOT devices generated by virtual reality module 220 allowing simulations of the ascertain innovative capabilities within the virtual environment presented to user 270. As described herein, IOT devices are nonstandard computing devices that connect wirelessly to a network and have the ability to transmit data. IOT typically involves extending Internet connectivity beyond standard devices, such as desktops, laptops, smartphones and tablets, to any range of traditionally non-Internet-enabled physical devices and everyday objects. Embedded with technology, these devices can communicate and interact over the Internet. Connected devices are part of an ecosystem in which every device can talk to other related devices in an environment to automate home or industry tasks. They can communicate sensor data to users, businesses and other intended parties. In some embodiments, IOT device feeds are aggregated based on data collected from the identified IOT device feeds, in which the feeds may be combined, correlated, and the like. IOT device module 240 may also receive historical data associated with the identified IOT devices from server 210, in which one or more web crawlers associated with server 210 may crawl internet-based data sources for relevant data associated with the identified IOT devices stored in database 215. The aggregated data derived from the IOT device feeds are stored in IOT device module database 250, which may serve as a source for training datasets associated with one or more machine learning models operated by IOT device module 240.

Computing device 260 may take the form of a desktop computer, laptop computer, tablet computer, smart phone, smart watch or other wearable computer, mainframe computer, computer-mediated reality (CMR) device/VR device, quantum computer or any other form of computer or mobile device now known or to be developed in the future that is capable of running a program, accessing a network, or querying a database. It should be noted that in the instance in which computing device 260 is a CMR device (e.g., VR headset, AR goggles, smart glasses, etc.) or other applicable wearable device, computing device 260 is configured to collect sensor data via one or more associated sensor systems including, but are not limited to, cameras, microphones, position sensors, gyroscopes, accelerometers, pressure sensors, cameras, microphones, temperature sensors, biological-based sensors (e.g., heartrate, biometric signals, etc.), a bar code scanner, an RFID scanner, an infrared camera, a forward-looking infrared (FLIR) camera for heat detection, a time-of-flight camera for measuring distance, a radar sensor, a LiDAR sensor, a temperature sensor, a humidity sensor, a motion sensor, internet-of-things ("IOT") sensors, or any other applicable type of sensors known to those of ordinary skill in the art.

Figure 3:
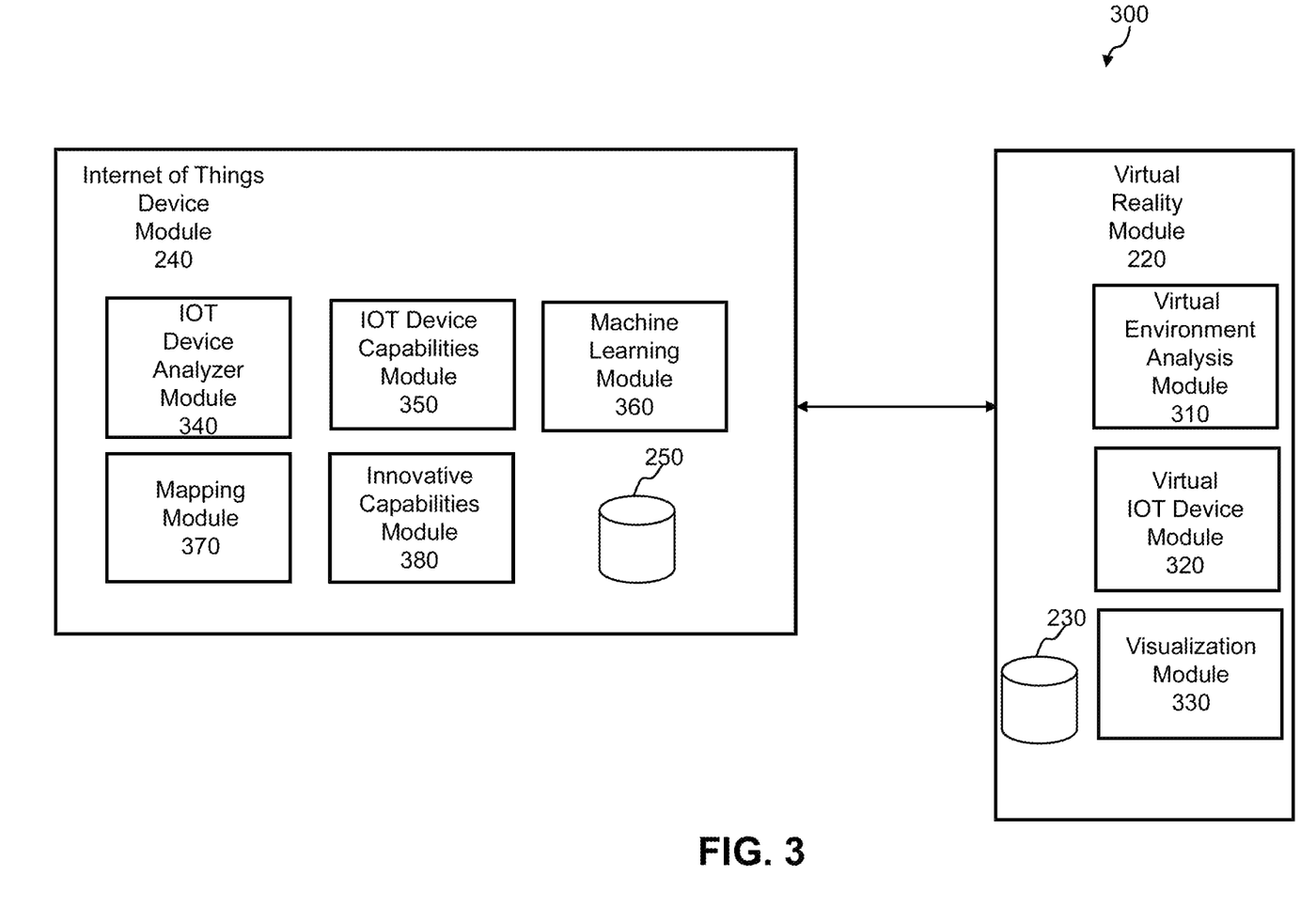
FIG. 3 illustrates a block diagram of a virtual reality module and an IOT device module of FIG. 2, according to an exemplary embodiment.

Referring now to FIG. 3, an example architecture 300 of virtual reality module 220 and IOT device module 240 is depicted, according to an exemplary embodiment. In some embodiments, virtual reality module 220 comprises a virtual environment analysis module 310, a virtual IOT device module 320, and a visualization module 330. IOT device module 240 comprises an IOT device analyzer module 340, an IOT device capabilities module 350, a machine learning module 360, a mapping module 370, and an innovative capabilities module 380. It should be noted that virtual reality module 220 and IOT device module 240 are communicatively coupled over the network allowing for outputs and/or analyses performed by each respective module to be utilized in applicable training datasets to be utilized by applicable machine learning models operated by machine learning module 360 and/or applicable cognitive systems associated with system 200.

Virtual environment analysis module 310 is tasked with analyzing virtual environments generated based on the physical space associated with IOT devices identified by IOT device module 240. It should be noted that the generation and maintenance of the virtual environment is based on a variety of factors including, but not limited to contextual information ascertained from the analyses of the virtual environment, configuration/layout of IOTs spanning a residential and/or industrial/enterprise space, geographic location of computing device 260, and any other applicable factors taken into account when rendering virtual spaces known to those of ordinary skill in the art. As described herein, contextual information may include, but is not limited to, user location, topic/subject matter, date/time, environment/virtual object theme/setting, a participant threshold of user 270 associated with the virtual interactions in the virtual environment (e.g., interactions with the virtual IOT device, dialogue occurring within the virtual environment, interactions with virtual elements, etc.), type of virtual event occurring within the virtual environment (e.g., E-sport, virtual concert, dining experience, shopping experience, etc.), occurrences of a predetermined pattern of content or activity within the event, or any other applicable contextual-based data known to those of ordinary skill in the art. Virtual reality module 220 may further utilize one or more techniques to analyze virtual environments including, but not limited to, natural language processing (NLP), image analysis, topic identification, virtual object recognition, setting/environment classification, and any other applicable artificial intelligence and/or cognitive-based techniques known to those of ordinary skill in the art. Virtual reality module 220 is further tasked with providing techniques that facilitate automatic, reliable performance of a point cloud object-environment segmentation task in order to analyze virtual environments. For example, virtual reality module 220 may provide the ability to perform automatic segmentation of a 3D point cloud into object and virtual environment segments by progressively learning the object-environment segmentation from tracking sessions in augmented reality (AR) applications associated with the centralized platform. In some embodiments, segmenting of the virtual environment allows virtual environment analysis module 310 to ascertain not only the context associated with a virtual environment and the use of IOT devices by user 270, but also the capabilities associated with the virtual environment that are desired by user 270 that are not currently present or in existence in the physical space. For example, the physical space the virtual environment is generated based on may include two separate IOT devices, in which one IOT device is a mobile device and the other IOT is a thermal camera neither IOT device including heartbeat detection, blood pressure detection, stress level analysis, etc. Thus, contextual information ascertained by virtual environment analysis module 310 enables IOT device module 240 to analyze the mobile device and the thermal camera to determine that neither IOT device has the innovative capabilities of heartbeat detection, blood pressure detection, and stress level analysis.

Virtual IOT device module 320 is tasked with managing the visual representation of the generated virtual IOT device, the capabilities of both the IOT devices and the virtual IOT device, and simulations relating to the aforementioned. In some embodiments, virtual representations of both the actual IOT devices and the virtual IOT device within the virtual environment can be generated by virtual IOT device module 320 based on characterizing information, proximity data (e.g., LIDAR-based, sonar-based, etc.) between IOT devices in the physical space, photogrammetry techniques applied to acquired to images of the physical space, computer visioning techniques, and the like. In addition to depicting the IOT devices and the virtual IOT devices, virtual IOT device module 320 is also configured to visualize simulations of the virtual IOT devices, innovative capabilities, etc. based on the contextual information ascertained from virtual environment analysis module 310.

As described herein, computer vision is an interdisciplinary field which grapples with how computers can be granted the ability to gain high-level understanding from digital images or videos. From an engineering perspective, it seeks to automate tasks that the human visual system can do. Computer vision related to the automatic extraction, analysis and understanding of useful information from a single image or a sequence of images such as an animation or video feed. It involves developing a theoretical and algorithmic basis to achieve automatic visual understanding. In particular, virtual IOT device module 320 may utilize computer visioning techniques to visualize IOT devices and virtual IOT devices within the virtual environment. Furthermore, the computer visioning techniques may optimize visualizations of the aforementioned by enabling virtual IOT device module 320 to depict extended reality (XR) representations of the IOT devices allowing each XR representation to be integrated into the virtual environment along with the virtual IOT device. In some embodiments, the visualizations of the IOT devices and the virtual IOT device within the virtual environment can resemble the physical space (e.g., IOT device position/locations, proximity of IOT devices to the virtual IOT device, etc.); however, positioning of the aforementioned devices may by placed and manipulated via user 270 with virtual interactions with the devices within the virtual environment (e.g., dragging and dropping, increasing size with fingers gestures, tilting/turning, etc.). Interactive features with the devices can include input mechanisms such as buttons, dials, switches, touch screen interfaces, and voice commands, among others. In some embodiments, interactive features associated with the IOT devices in the real world can be mirrored into the virtual environment. For example, if a first IoT device has three buttons and a dial within the real-world, the three buttons and the dial can be integrated (e.g., programmed) into the virtual environment such that user 270 can interact with the same interactive features within the virtual environment. Furthermore, one or more buttons, switches, dials, touch displays, etc. can be added to a representation of an IOT device within the virtual environment that the IoT device does not include in the real world. In other embodiments, the devices may be represented with symbols, avatars, letters, numbers, or any other form of virtual representation known to those of ordinary skill in the art.

Visualization module 330 is tasked with visualizing the IOT devices and the virtual IOT device within the virtual environment. Visualization module 330 further supports rendering of the virtual environment in a manner in which user 270 may engage with the IOT device representations along with the generated virtual IOT device. In addition, visualization module 330 may generate simulations depicting potential consequences and possible solutions associated with the generated virtual IOT device. User 270 may navigate the virtual environment while being engaged with the virtual IOT device allowing the visualizations to depicted based upon various contexts and scenarios. Visualization module 330 further supports visualization of consequences of the innovative capabilities of the virtual IOT device visualized by virtual reality module 220 within the virtual environment based on contextual situations (such as test cases) that may result in reactions, consequences, accidents, etc. directly correlated to the innovative capabilities. In some embodiments, visualizations of previously generated virtual IOT devices may be stored in virtual reality module database 230 for analysis for feedback loop purposes in order to optimize ascertaining the acquisition of innovative capabilities.

IOT device analyzer module 340 is tasked with detecting and analyzing IOT devices in the physical space. In some embodiment, IOT device analyzer module 340 performs aggregation of data feeds associated with IOT sensors of the detected IOT devices along with the applicable sensors of computing device 260. For example, IOT sensors including, but not limited to cameras, microphones, position sensors, gyroscopes, accelerometers, pressure sensors, temperature sensors, biological-based sensors (e.g., heartrate, biometric signals, etc.), a bar code scanner, an RFID scanner, an infrared camera, a forward-looking infrared (FLIR) camera for heat detection, a time-of-flight camera for measuring distance, a radar sensor, a LiDAR sensor, a temperature sensor, a humidity sensor, a motion sensor, or any other applicable type of IOT sensors known to those of ordinary skill in the art. In some embodiment, IOT feeds may be analyzed using video analysis, image analysis, and/or any other applicable cognitive-based techniques. In some embodiment, when different types of IoT feeds are analyzed, different types of analysis outcomes and decision/automation can be implemented via IOT device analyzer module 340.

IOT device capabilities module 350 is configured to ascertain the capabilities of the IOT devices identified by IOT device analyzer module 340. As provided, capabilities can include, but are not limited to, functionalities, dimensions, control features, any workflows among the IOT devices, location and/or mobility IOT devices, usage behavior of each device, and/or the like. Specifying capabilities may be based upon analysis of the data feeds of the IOT sensors, in which a respective IOT device may include more than one capability. For example, an IOT speaker may include hands-free communication and audio-playback and a IOT microphone may include voice recognition; however, neither the IOT speaker nor the IOT microphone account for a feature such as sound calibration alone or in combination, which is useful when the desire is to adjust sound according to the layout of a physical space. Thus, sound calibration is the innovative capability that may be accounted for in the virtual IOT device when it is generated by IOT device module 320 which is a combination of the respective capabilities of the IOT devices.

Machine learning module 360 is configured to use one or more heuristics and/or machine learning models for performing one or more of the various aspects as described herein. In some embodiments, the machine learning models may be implemented using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, Siamese network ("twin neural network"), long short-term memory (LSTM), convolutional neural network (CNN), recursive neural network (RNN), sequence-to-sequence model, shallow neural network, multilayer perceptron (MLP), back propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting, and any other applicable machine learning algorithms known to those of ordinary skill in the art. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure. In particular, machine learning module 360 is configured to operate and maintain one or more machine learning models configured to utilized training datasets derived from database 215, virtual reality module database 230, IOT device module database, and any other applicable data source, in which the one or more machine learning models are configured to generate outputs representing predictions of innovative capabilities to be integrated into the generated virtual IOT device.

Mapping module 370 is tasked with mapping IOT devices identified in the physical space to capabilities. In some embodiments, mapping module 370 communicates with machine learning module 360 in order to utilize supervised or unsupervised learning to map IOT devices to various capabilities. For example, mapping module 370 may utilize one or more algorithms (i.e., learned and trained) map various input-output pairs of IoT feed data to functionalities such as, but not limited to thermocouple data feed mapped to temperature sensing, piezoelectric data feed to pressure sensing, image data feed to photon conversion, and the like. In some embodiments, the applicable IOT-device data feed may be mapped to specific environment-based functions, such as but not limited to lighting fixtures to lighting, thermostats to temperature, security systems to monitoring, refrigerators to cooling, dishwashers to cooling, and the like. It should be noted that one of the purposes of mapping module 370 is allow capabilities to be aggregated in order to create innovative capabilities for immersion into the virtual environments and ensure the data from the IOT data feeds is optimized prior to being applied to virtual IOT device. For example in the instance in which an identified IOT device is a thermal camera, the IOT device may include the capability of applying color-coded schemes based on the type of associated data (e.g., temperature, infrared, motion, etc.), in which mapping module 370 would ensure normalization of the applicable values associated with the data. Thus, a metric ascertainable from the IOT data feed of the thermal camera (e.g., beats per minute of the heartbeat of users 270) could be utilized to measure other metrics (e.g., oxygen consumption and cardio activity of user 270).

Innovative capabilities module 380 is tasked with ascertaining innovative capabilities based on one or more of the capabilities associated with detected IOT devices and the contextual information ascertained by virtual environment analysis module 310. For example, contextual information derived from linguistic inputs occurring within the virtual environment (e.g., utterances of user 270) allows innovative capabilities module 380 to ascertain that a particular capability is not present among the identified IOT device allowing innovative capabilities module 380 to communicate with machine learning module 360 in order to ascertain the particular capability as an innovative capability. For example in the instance in which the physical space is a "smart home" environment or other applicable smart environment, IOT data feeds associated with the appliances, garage opener, computing devices, media devices, clocks, Bluetooth devices, etc. are analyzed in order for innovative capabilities module 380 to ascertain which capabilities/functions are not present within the "smart home". As a result, the capabilities not currently present are labeled as innovative capabilities and stored in IOT device module database 250.

Figure 4:
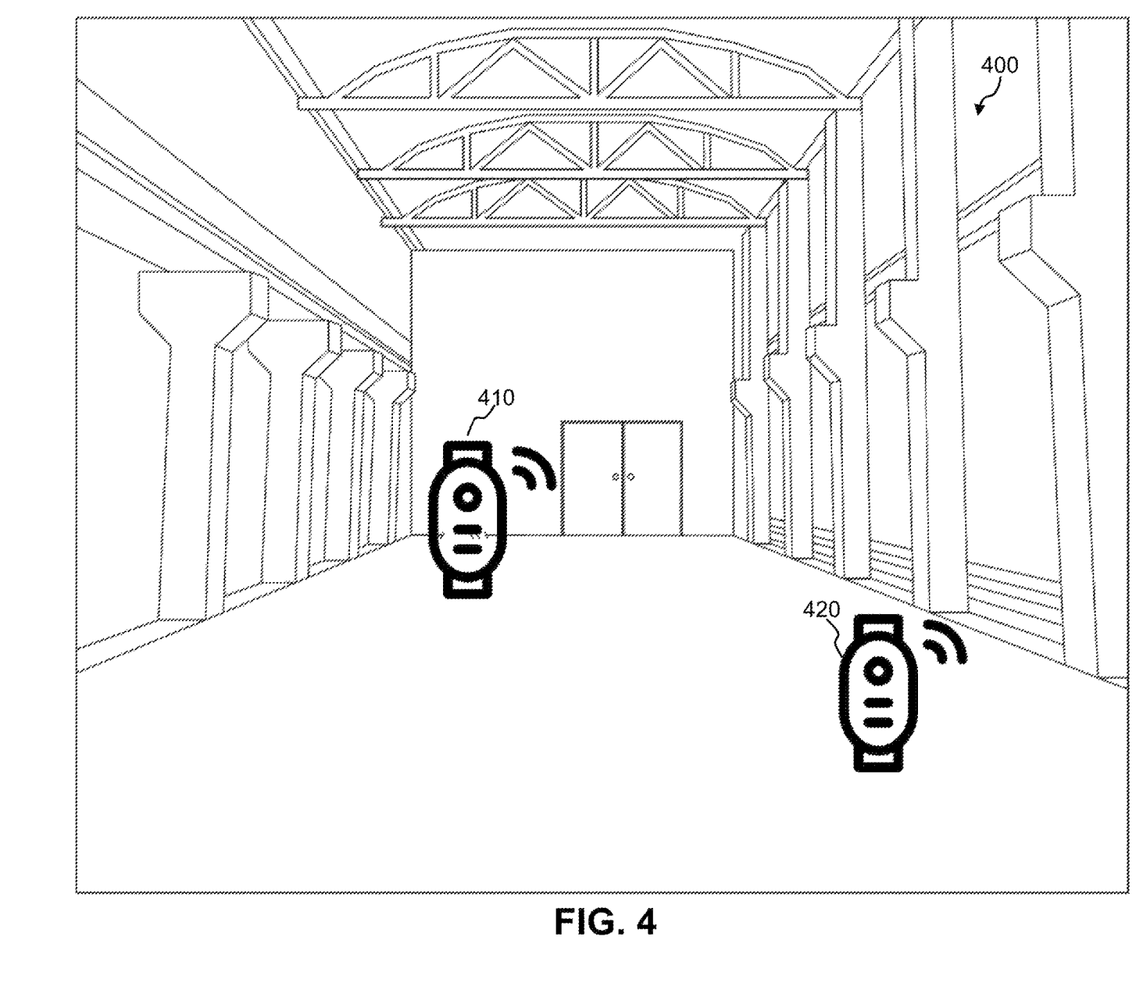
FIG. 4 illustrates multiple IOT devices within a physical space depicted within a virtual environment, according to an exemplary embodiment.

Referring now to FIG. 4, a smart environment 400 is depicted, according to an exemplary embodiment. Smart environment 400 comprises a plurality of IOT devices 410 and 420 configured to communicate with each over the network. In a preferred embodiment, computing device 260 is configured to communicatively couple to IOT devices 410 and 420 in order to transmit IOT data feeds of IOT devices 410 and 420 over the network to system 200. In some embodiments, computing device 260 is connected to a monitoring system, imaging system, computer visioning system, or any other applicable system configured to be associated with a smart network known to those of ordinary skill in the art. It should be noted that smart environment 400 is the basis for analysis and subsequent generation of the virtual environment by virtual reality module 220. However in some embodiments, identification and registration of IOT devices 410 and 420 can be accomplished by user 270 manually provided inputs to the centralized platform and/or submission of images, videos, blueprints, and other applicable sources including characterizing information associated with smart environment 400 and/or IOT devices 410 and 420. Various illustrations of IOT devices 410 and 420 in accordance with the preference of user 270 are within spirit of the disclosure. For example, user 270 may arrange IOT devices 410 and 420 in a particular manner at various sizes within a fabricated/fictional virtual environment subject to their preferences.

Figure 5:
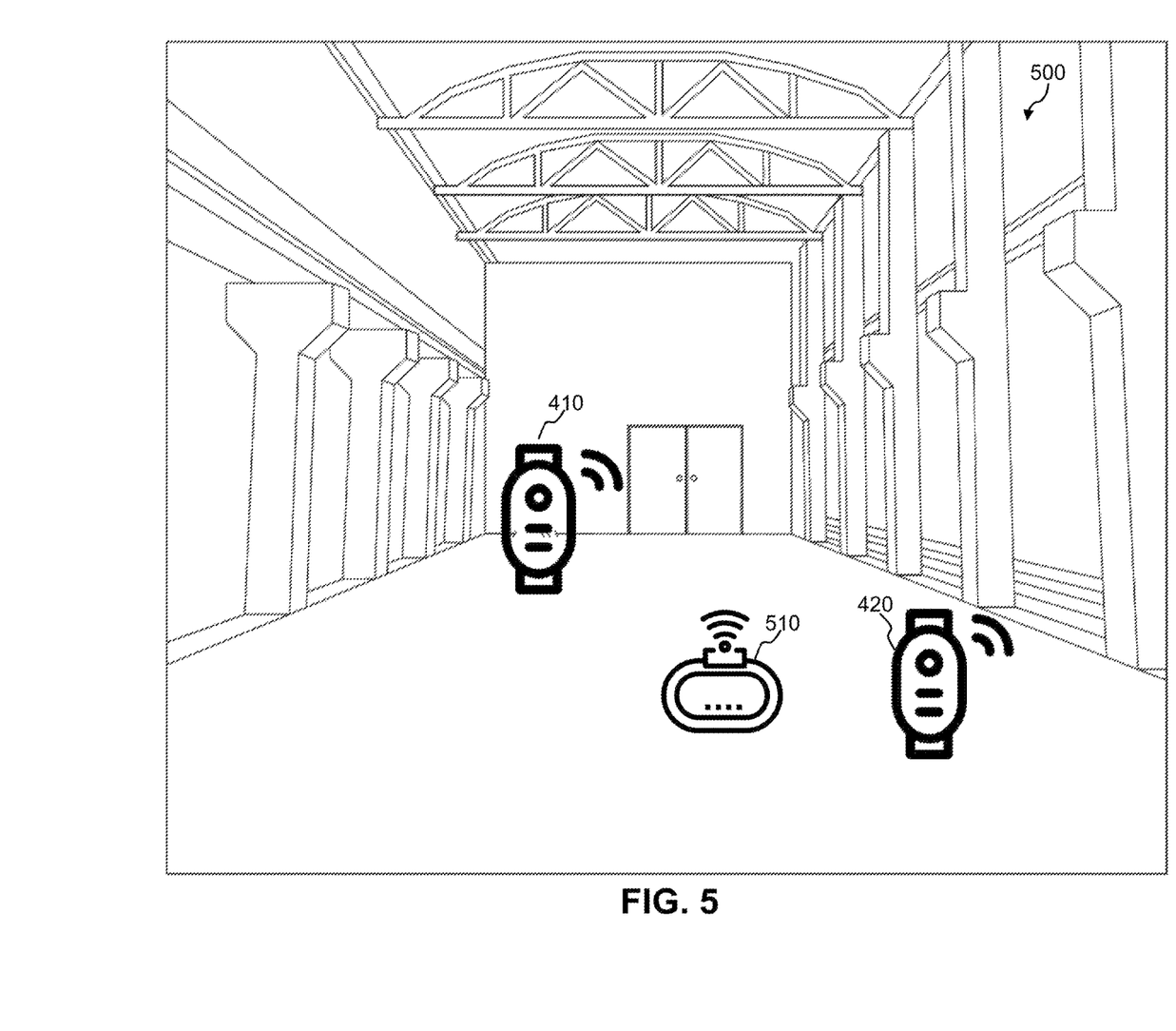
FIG. 5 illustrates a virtual IOT device visualized within the physical space of FIG. 4. generated by IOT device virtualization system based on analysis of the multiple IOT devices, according to an exemplary embodiment.

Referring now to FIG. 5, a virtual environment 500 presented to computing device 260 is depicted, according to an exemplary embodiment. Virtual environment 500 comprises a virtual IOT device 510 generated based on analyses of IOT devices 410 and 420 and their respective capabilities, which results in at least one innovative capability associated with virtual IOT device 510 being ascertained. In some embodiments, virtual environment 500 is an XR environment configured to feature digital representations of IOT devices 410 and 420, virtual IOT device 510, and their respective capabilities. Furthermore, interactive features (e.g., touch displays, dials, buttons, etc.) of the aforementioned are designed to be integrated into the digital representations supporting not only a more interaction virtual experience for user 260 in the virtual environment, but also mechanisms for initiation of simulations of the capabilities of virtual IOT device 510 which represent consequences of the innovative capabilities visualized by virtual reality module 220 within the virtual environment based on contextual situations (such as test cases) that may result in reactions, consequences, accidents, etc. directly correlated to the innovative capabilities. In some embodiments, the innovative capabilities are the result of the one or more machine learning models comprising training datasets derived from database 215, virtual reality module database 230, and/or IOT device module database 250, in which the outputs of the one or more machine learning models are predictions associated with the innovative capabilities based on the contextual information. For example, IOT device 410 may be a mobile device comprising a gyroscope, positioning module, pedometer, and a biometric measuring unit, and IOT device 420 may be a thermal camera comprising infrared features. Subsequent to the mapping of the respective features of IOT devices 410 and 420, virtual IOT device 510 is generated comprising the innovative capability of measuring the heartbeat of user 270 based on one or more of the predictions of the machine learning models and/or the contextual information. In some embodiments, capabilities of IOT devices 410 and/or 420 may be utilized to optimize the innovative capabilities associated with virtual IOT device 510 within the virtual environment. For example, accelerometer-based capabilities extracted from IOT device 410 may optimize virtual IOT device 510 by adding virtual mouse input features configured to allow user 270 to utilize virtual interactions (e.g., gestures, nodding, body movements, etc.) as a cursor within the virtual environment for controlling purposes of virtual IOT device 510.

Figure 6:
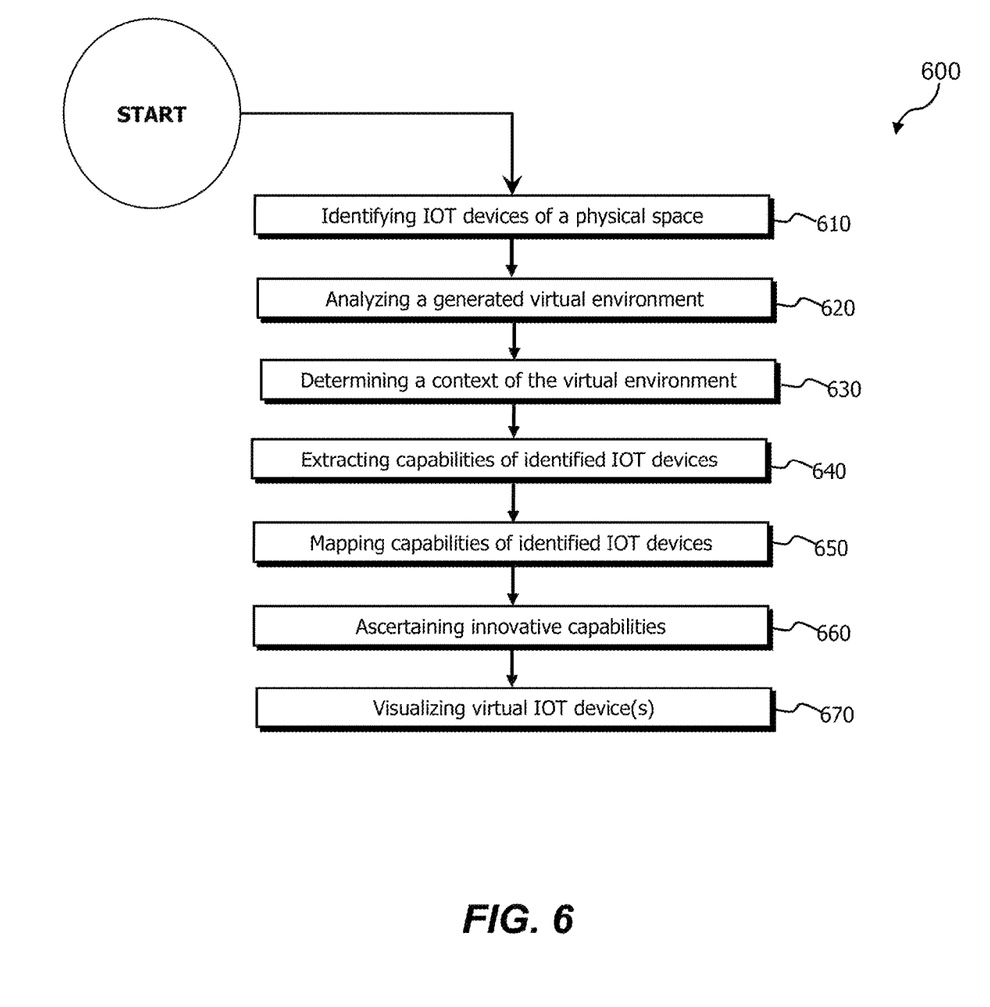
FIG. 6 illustrates an exemplary flowchart depicting a method for representing Internet-Of-Things (IOT) devices in a virtual environment, according to an exemplary embodiment.

With the foregoing overview of the example architecture, it may be helpful now to consider a high-level discussion of an example process. FIG. 6 depicts a flowchart illustrating a computer-implemented process 600 for representing Internet-Of-Things (IOT) devices in a virtual environment, consistent with an illustrative embodiment. Process 600 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

At step 610 of process 600, IOT device analyzer module 340 identifies IOT devices within a physical space. It should be noted that the physical space may be a residential, industrial/enterprise space, and/or any other applicable smart environment known to those of ordinary skill in the art. IOT device analyzer module 340 analyzes the IOT data feeds associated with the identifies IOT devices along with performs aggregation of data feeds associated with IOT sensors of the detected IOT devices and the applicable sensors of computing device 260, monitoring systems, computer visioning systems, and the like. In some embodiments, IOT device analyzer module 340 supports IOT device capabilities module 350 in generating profiles for IOT devices configured to be continuously updated with characterizing data including capabilities, dimensions, configurations, and the like along with historical information associated with the identified IOT devices.

At step 620 of process 600, virtual environment analysis module 310 analyzes a virtual environment generated by virtual reality module 220 based on the physical space. It should be noted that virtual environments, such as, but not limited to, metaverses, may require image/video analysis, parsing, tokenizing, 3D point cloud segmentation, virtual object detection, theme identification, or any other applicable VR/AR-based analysis mechanisms known to those of ordinary skill in the art. In addition, virtual environment analysis module 310 may utilize natural language processing and other applicable cognitive-based techniques in order to process linguistic inputs of user 270 that indicate a desire for a particular innovative capability that is not currently present.

At step 630 of process 600, virtual environment analysis module 310 determines the contextual data of the virtual environment based on the analyses. Contextual data may be ascertained from the dialogue, layouts/themes, and/or virtual elements integrated within the virtual environment such as, but not limited to, avatars, widgets, virtual objects, and any other applicable computer-generated objects and computer mediated reality incorporating visual, auditory, and other forms of sensory feedback. For example, virtual environment analysis module 310 may perform analyses on a virtual environment in order to ascertain a theme and/or topic associated with the virtual environment based on virtual objects and demands for particular capabilities not currently present within the virtual environment. For example, data ascertained from a detected IOT camera could be utilized to allow the IOT camera to function as a global positioning system in the physical space and/or for tracking the location of user 270 while traversing the virtual environment based upon an established context indicating locomotion monitoring is desired.

At step 640 of process 600, IOT device capabilities module 350 extracts capabilities from the identified IOT devices. As previously mentioned, capabilities can include, but are not limited to, functionalities, dimensions, control features, any workflows among the IOT devices, location and/or mobility IOT devices, usage behavior of each device, and/or the like. Specifying capabilities may be based upon analysis of the data feeds of the IOT sensors, in which a respective IOT device may include more than one capability. In some embodiments, extracts capabilities of identified IOT devices also comprises collecting historical information associated with the identified IOT devices and filtering IOT capabilities in relation to the historical information resulting demands for particular capabilities that are not in existence in the physical space to be ascertained based on the contextual information.

At step 650 of process 600, mapping module 370 performs mapping of the capabilities to the IOT devices. Mapping module 370 communicates with machine learning module 360 in order to utilize supervised or unsupervised learning to map IOT devices to various capabilities. Furthermore, a feedback loop may be maintained by machine learning module 360 in order to optimize the mapping of the capabilities of the IOT devices; thus, facilitating a quicker mechanism to ascertain whether a particular capability not currently in existence in the physical space is in fact innovative.

At step 660 of process 600, innovative capabilities module 380 ascertains the innovative capabilities based on the analyses of the identified IOT devices. Innovative capabilities module 380 communicates with mapping module 370 maps at least a subset of a first plurality of IOT capabilities associated with a first IOT device in the physical space and optionally a second plurality of IOT capabilities associated with a second IOT device resulting in IOT capabilities being combines to generate the at the least one innovative capability. In some embodiments, the innovative capabilities are ascertained via machine learning module 360 processing the mappings based on the contextual information. For example, mappings that ascertained a gyroscope capability source from IOT headphones, imaging capabilities sourced from an IOT camera, and timing functionality ascertained from computing device 260 may be processed by machine learning module 360 resulting in innovative capabilities module 380 communicating with and instructing virtual IOT device module 320 to render virtual IOT device as a virtual smartwatch location, timing, and gyroscope functionalities.

At step 670 of process 600, visualization module 330 generates the virtual IOT device for visualization within the virtual environment. Visualization module 330 renders the virtual IOT device based on the extracted capabilities of the identified IOT devices; however, visualization module 330 is further configured to generate simulations of innovative capabilities assigned to virtual IOT devices in addition to consequences of the innovative capabilities visualized by virtual reality module 220 within the virtual environment based on contextual situations (such as test cases) that may result in reactions, consequences, accidents, etc. directly correlated to the innovative capabilities. In some embodiments, the virtual IOT device mimics a real-world object within the virtual environment allowing the simulations to have a more realistic effect.

Based on the foregoing, a method, system, and computer program product have been disclosed. However, numerous modifications and substitutions can be made without deviating from the scope of the present invention. Therefore, the present invention has been disclosed by way of example and not limitation.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-payment devices or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter payment device or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that, although specific embodiments have been described herein for purposes of illustration, various modifications may be made without departing from the spirit and scope of the embodiments. In particular, transfer learning operations may be carried out by different computing platforms or across multiple devices. Furthermore, the data storage and/or corpus may be localized, remote, or spread across multiple systems. Accordingly, the scope of protection of the embodiments is limited only by the following claims and their equivalent.

What is claimed is:

1. A computer-implemented method for representing Internet-Of-Things (IOT) devices in a virtual environment, the method comprising:
   detecting, by a computing device, a plurality of IOT devices associated with a physical space;
   extracting, by the computing device, a first IOT capability of a first IOT device and a second capability of a second IOT device of the plurality of IOT devices;
   rendering, by the computing device, a virtual IOT device, wherein rendering comprises utilizing a machine learning model to predict at least one innovative capability based on a plurality of contextual information associated with the physical space;
   wherein the plurality of contextual information comprises results derived from filtering a profile of the first and second IOT devices for a demand for the at least one innovative capability based on an ascertained theme associated with the virtual environment;
   combining and mapping, by the computing device, the first and second IOT capabilities based on the plurality of contextual information resulting in generating the at least one innovative capability; and
   visualizing, by the computing device, the virtual IOT device comprising the at least one innovative capability within the virtual environment associated with the physical space.

2. The computer-implemented method of claim 1, wherein rendering the virtual IOT device comprises:
   analyzing, by the computing device, the first and second IOT capabilities;
   determining, by the computing device, the plurality of contextual information associated with the physical space based on the analysis; and
   aggregating, by the computing device, the first and second IOT capabilities to create the at least one innovative capability based on the plurality of contextual information.

3. The computer-implemented method of claim 2, wherein determining the at least one innovative capability comprises:
   utilizing, by the computing device, one or more machine learning models to generate at least one output representing the innovative capability;
   wherein the innovative capability is a capability of the virtual IOT device.

4. The computer-implemented method of claim 1, wherein the virtual IOT device mimics a real-world object within the virtual environment.

5. The computer-implemented method of claim 2, wherein rendering the virtual IOT device comprises:
   mapping, by the computing device, at least a subset of a first plurality of IOT capabilities associated with a first IOT device in the physical space and a second plurality of IOT capabilities associated with a second IOT device; and
   combining, by the computing device, the at the least one innovative capability.

6. The computer-implemented method of claim 1, wherein the virtual IOT device lacks existence in the physical space.

7. The computer-implemented method of claim 1, wherein extracting the plurality of IOT capabilities comprises:
   collecting, by the computing device, historical information associated with the plurality of IOT devices; and
   filtering, by the computing device, the plurality of IOT capabilities based on the historical information.

8. A computer program product for representing Internet-Of-Things (IOT) devices in a virtual environment, the computer program product comprising or more computer readable storage media and program instructions collectively stored on the one or more computer readable storage media, the stored program instructions comprising:
   program instruction to detect a plurality of IOT devices associated with a physical space;
   program instruction to extract a first IOT capability of a first IOT device and a second capability of a second IOT device of the plurality of IOT devices;
   program instruction to render a virtual IOT device, wherein program instructions to render comprise program instructions to utilize a machine learning model to predict at least one innovative capability based on a plurality of contextual information associated with the physical space;
   wherein the plurality of contextual information comprises results derived from program instruction to filter a profile of the first and second IOT devices for a demand for the at least one innovative capability based on an ascertained theme associated with the virtual environment;
   program instruction to combine and map the first and second IOT capabilities based on the plurality of contextual information resulting in generating the at least one innovative capability; and
   program instruction to visualize the virtual IOT device comprising the at least one innovative capability within the virtual environment associated with the physical space.

9. The computer program product of claim 8, wherein the program instructions to render the virtual IOT device comprises:
   program instructions to analyze the first and second IOT capabilities;
   program instructions to determine the plurality of contextual information associated with the physical space based on the analysis; and
   program instructions to aggregate the first and second IOT capabilities to create the at least one innovative capability based on the plurality of contextual information.

10. The computer program product of claim 9, wherein the program instructions to determine the at least one innovative capability comprise:
    program instructions to utilize one or more machine learning models to generate at least one output representing the innovative capability;
    wherein the innovative capability is a capability of the virtual IOT device.

11. The computer program product of claim 9, wherein program instructions to render the virtual IOT device comprise:
    program instructions to map at least a subset of a first plurality of IOT capabilities associated with a first IOT device in the physical space and a second plurality of IOT capabilities associated with a second IOT device; and
    program instructions to combine the at the least one innovative capability.

12. The computer program product of claim 9, wherein program instructions to extract the plurality of IOT capabilities comprise:
    program instructions to collect historical information associated with the plurality of IOT devices; and
    program instructions to filter the plurality of IOT capabilities based on the historical information.

13. The computer program product of claim 8, wherein the virtual IOT device mimics a real-world object within the virtual environment.

14. The computer program product of claim 8, wherein the virtual IOT device mimics a real-world object within the virtual environment.

15. A computer system for representing Internet-Of-Things (IOT) devices in a virtual environment, the computer system comprising:
    one or more processors;
    one or more computer-readable memories;
    program instructions stored on at least one of the one or more computer-readable memories for execution by at least one of the one or more processors, the program instructions comprising:
      program instruction to detect a plurality of IOT devices associated with a physical space;
      program instruction to extract a first IOT capability of a first IOT device and a second capability of a second IOT device of the plurality of IOT devices;
      program instruction to render a virtual IOT device, wherein program instructions to render comprise program instructions to utilize a machine learning model to predict at least one innovative capability based on a plurality of contextual information associated with the physical space;

wherein the plurality of contextual information comprises results derived from program instruction to filter a profile of the first and second IOT devices for a demand for the at least one innovative capability based on an ascertained theme associated with the virtual environment;

program instruction to combine and map the first and second IOT capabilities based on the plurality of contextual information resulting in generating the at least one innovative capability; and program instruction to visualize the virtual IOT device comprising the at least one innovative capability within the virtual environment associated with the physical space.

16. The computer system of claim 15, wherein the program instructions to render the virtual IOT device comprises:

program instructions to analyze the first and second IOT capabilities;

program instructions to determine the plurality of contextual information associated with the physical space based on the analysis; and program instructions to aggregate the first and second IOT capabilities to create the at least one innovative capability based on the plurality of contextual information.

17. The computer system of claim 16, wherein the program instructions to determine the at least one innovative capability comprise:

program instructions to utilize one or more machine learning models to generate at least one output representing the innovative capability;

wherein the innovative capability is a capability of the virtual IOT device.

18. The computer system of claim 16, wherein program instructions to render the virtual IOT device comprise:

program instructions to map at least a subset of a first plurality of IOT capabilities associated with a first IOT device in the physical space and a second plurality of IOT capabilities associated with a second IOT device; and program instructions to combine the at the least one innovative capability.

19. The computer system of claim 15, wherein the virtual IOT device lacks existence in the physical space.

20. The computer system of claim 15, wherein the virtual IOT device mimics a real-world object within the virtual environment.

* * * * *